United States Patent [19]
Adams et al.

[11] 3,849,050
[45] Nov. 19, 1974

[54] APPARATUS FOR EMBOSSING PLASTIC MATERIAL

[75] Inventors: James M. Adams, Terre Haute; Randall R. Hopper, Shelburn; James K. Rutherfoord; Gauland E. Raley, Terre Haute, all of Ind.

[73] Assignee: Ethyl Corporation, Richmond, Va.

[22] Filed: Jan. 15, 1973

[21] Appl. No.: 323,452

[52] U.S. Cl............... 425/363, 425/384, 425/385, 264/216, 264/284
[51] Int. Cl. .......................................... B29c 15/00
[58] Field of Search ............. 425/363, 72, 385, 384; 264/216, 284, 101

[56] References Cited
UNITED STATES PATENTS

| | | | |
|---|---|---|---|
| 2,928,124 | 3/1960 | Hugger | 425/385 X |
| 3,313,002 | 4/1967 | Wyeth | 425/363 X |
| 3,374,303 | 3/1968 | Metz, Jr. | 264/216 |
| 3,499,064 | 3/1970 | Tsuboshima et al. | 425/384 X |

*Primary Examiner*—Robert L. Spicer, Jr.
*Attorney, Agent, or Firm*—Donald L. Johnson; John F. Sieberth; E. Donald Mays

[57] ABSTRACT

An apparatus for embossing thermoplastic material, particularly thin, flexible, thermoplastic films. A continuous length of preformed thermoplastic film is fed through a zone of heated, preferably recirculating, air to raise the temperature of the film above its softening point. The film is then immediately fed between adjacent, counter-rotating embossing rolls, thereby embossing the pattern onto the film. The rolls are cooled to fix the embossed pattern on the film. The embossed film has little or no tendency to curl, has good moduli, low surface gloss or light reflectance, deep embossed pattern, high tensile strength and high impact strength.

13 Claims, 4 Drawing Figures

APPARATUS FOR EMBOSSING PLASTIC MATERIAL

BACKGROUND OF THE INVENTION

1. Field of the Invention

This invention relates to an apparatus for producing embossed thermoplastic materials, particularly thin, flexible, thermoplastic films.

2. Description of the Prior Art

Embossed plastic film or sheet material has come into widespread use in many fields. One particularly large scale use of embossed thermoplastic sheet material is that of disposable articles such as hospital pads and drapes, wearing apparel and disposable diapers. Embossed film is also finding increased use in the packaging field, for example, as bags and overwraps for articles such as clothing, etc., and for shopping bags. In order to fulfill the requirements established by the end use of embossed film, it is desirable that the film have little or no tendency to curl when run through fabricating machines, particularly those used for manufacture of disposable clothing articles, e.g., diapers. In some cases, it is important that the embossed thermoplastic film be very soft and flexible and have the proper pattern and embossment depth in order to provide the desired "hand" or clothlike feel for the thermoplastic embossed material. Additionally, it is desired that the embossed thermoplastic material for many uses have as low a surface gloss as possible in order to simulate woven clothlike fabrics. Further, embossed thermoplastic materials must meet the minimum physical requirements necessary for the films to be handled in high speed, automatic, fabricating machinery, i.e., it should have suitable modulus, tensile strength and impact strength.

Heretofore, embossed thermoplastic films such as polyethylene, polypropylene, polybutene-l, polyvinyl chloride and other flexible thermoplastics normally extruded into film have been made by various methods. One method used to prepare embossed thermoplastic film is to extrude the thermoplastic material, e.g., polyethylene, from a conventional slotted extrusion die onto a continuously moving, smooth, cooled casting surface, e.g., a chill roll. The engraved pattern may be applied to the chill roll and the film pressed to the roll while in the amorphous or molten stage by press rolls. Alternatively, the chill roll may be very smooth and the desired pattern in the film may be impressed into the film on the chill roll by means of an engraved or machined embossing roll which is pressed against the film and the chill roll to impress the pattern into the film as it is cooled on the chill roll. The softness of embossed polyethylene film produced by chill casting is directly related to the density of the polyethylene resin used. In order to obtain different degrees of softness or stiffness, it is necessary to use a number of different polyethylene resins having different densities. Thus, if it is desired to produce a relatively stiff embossed film, it is necessary to use more expensive polymers having high densities as the feed material to the slot die. Additionally, it is difficult to change many of the physical characteristics desired in the film when using the foregoing slot die-chill cast roll embossing technique. The embossed film made by the above described process often produces poor roll conformation, i.e., they have hard or soft spots, wrinkle or sag due to the inability to distribute zones of thickness variation in the film across the width of the roll of embossed film. Embossed film rolls of poor conformation produce problems when running the film through fabricating machines or through a film printing apparatus. An example of a method and apparatus for producing film according to the foregoing slot die-chill cast roll technique is shown in U.S. Pat. No. 3,374,303.

Other apparatuses used for embossing plastic films heretofore have utilized a heated, engraved, embossing roll used in conjunction with a backup roll. The preformed strip of thermoplastic film, normally at room temperature, is passed between the nip of a heated engraved roll and a backup roll and is embossed by being heated while in contact with the heated engraved roll. The resultant embossed film usually has a shallow and poorly defined pattern. An example of an apparatus and process for carrying out embossing of this type is shown in U.S. Pat. No. 3,176,058.

Another apparatus for embossing thermoplastic film used heretofore includes a heated roll or a series of heated rolls to heat the film to a softened state. The heated film is then fed to an embossing roll and pressed against the embossing roll by a backup roll. Normally the embossing roll and the backup roll are cooled in order to set the embossed pattern into the film so that it may be immediately wound up into rolls, if desired. An apparatus for embossing film using heated rolls is shown in U.S. Pat. No. 3,246,365.

One of the drawbacks when using the heated roll or drum apparatus to apply heat to the film prior to embossing is the difficulty in heating the film to a sufficiently high temperature so that it will take a deep, permanent embossed pattern which is a true reproduction of the engraved surface of the engraving roll. If the film is heated to a sufficiently high temperature to obtain a very deep and permanent impression when pressed against the engraving roll, oftentimes the film will stick or adhere to the heating rolls, thus causing tears or slack or drape problems in handling the films between the heating rolls and the embossing rolls. Since the film cannot be heated to the desired temperature using heated rolls, this results in a loss of the density depression which is desired oftentimes to produce very soft, flexible film. The density depression that can be produced when embossing a film is a direct measure of the temperature differential existing between the heated film and the cold embossing rolls.

Thus, it can be seen that the film embossing art is in need of an apparatus whereby preformed thermoplastic film can be rapidly heated to a sufficiently high temperature to obtain a deep, permanent, embossed pattern on the film and yet which will provide wide variation in control of the parameters which establish the physical properties of the embossed film, i.e., modulus, surface gloss, embossed pattern depth, tensile strength and impact strength.

SUMMARY OF THE INVENTION

It is an object of the present invention to provide an apparatus for producing embossed thermoplastic film which permits wide variation in the physical properties of the embossed film produced on the apparatus.

It is a further object of the present invention to provide an apparatus for the manufacture of embossed thermoplastic films having different physical properties from a single type film feedstock.

It is a still further object of the present invention to provide an apparatus for embossing film which heats the film by a non-direct contacting heat source.

It is another object of the present invention to provide an apparatus for heating film by directing a heated stream of air against the film.

The apparatus of the present invention for embossing thermoplastic film includes means for supplying a moving, continuous, preformed length of film. Means are provided for applying at least one stream of heated air to a selected area of the film to raise the temperature of the film to its softening point. Means are provided for embossing a raised pattern on the heated film. Means are provided to cool the film substantially below its softening point to set the raised pattern in the film.

The apparatus of the present invention is particularly suited for in-line embossing of films produced by the blown bubble process using an annular extrusion die, for example, film produced by the process and apparatus set forth in U.S. Pat. No. 2,632,206, the disclosure of which is hereby incorporated herein by reference.

DESCRIPTION OF THE PREFERRED EMBODIMENTS

Figure 1:
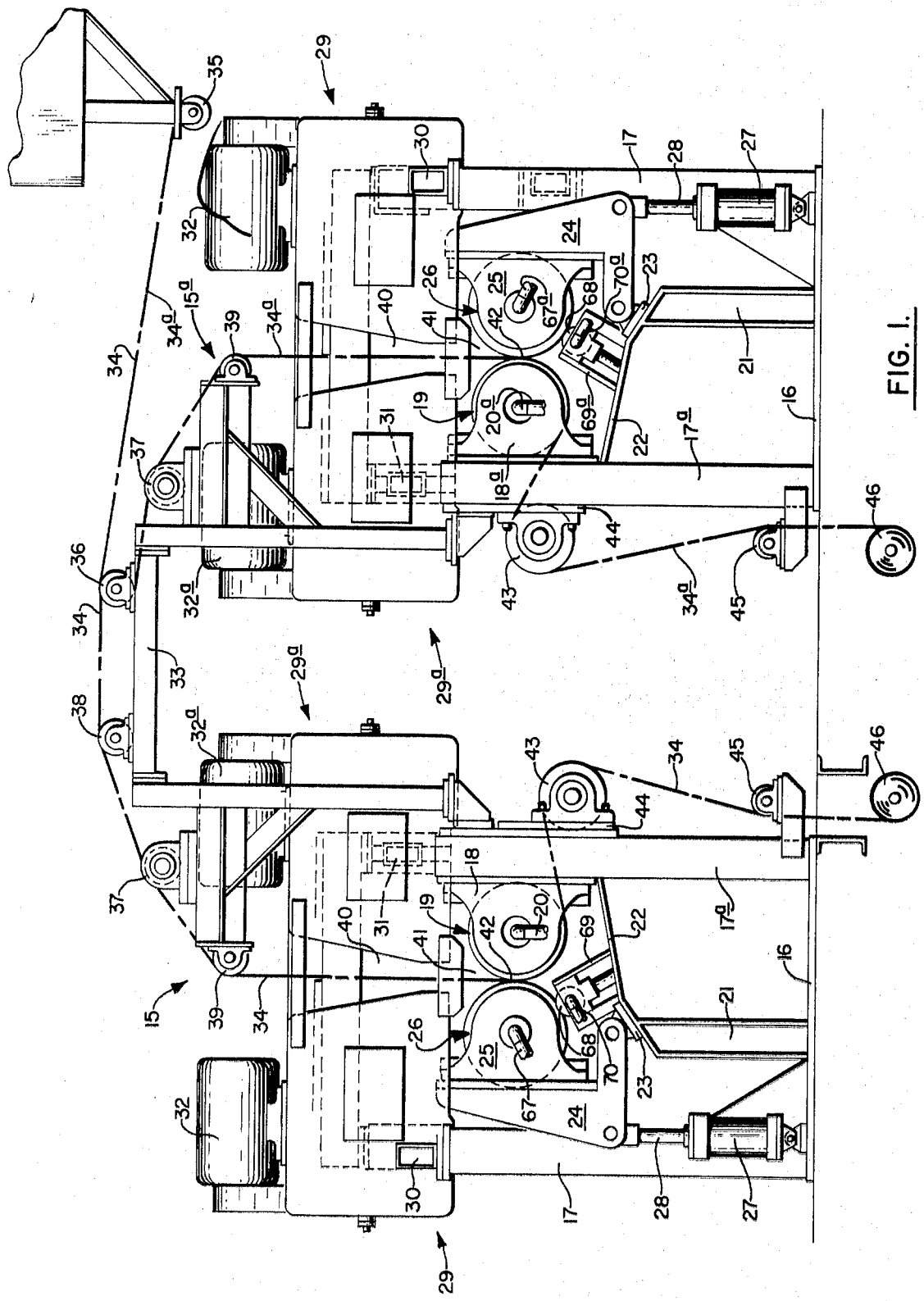
FIG. 1 is a side, elevational view of an apparatus constructed in accordance with the present invention for producing thermoplastic embossed film.

Referring now to FIG. 1, there is depicted a pair of machines for embossing thermoplastic film or webs constructed in accordance with the present invention. The left embossing apparatus, designated generally 15, and the right embossing apparatus, designated generally 15a, are substantial duplicates of each other and the same reference numerals will be used in describing the construction of both apparatuses. The view of the right-hand embossing apparatus 15a shown in FIG. 1 corresponds to a rear view of the left-hand embossing apparatus 15 shown in FIG. 1.

Each embossing apparatus is mounted on a base plate 16 which has extending upwardly therefrom four vertical support stanchions, outer stanchions 17—17 and inner stanchions 17a—17a. A pair of spaced apart trunnion blocks 18 and 18a are attached to the inner vertical support stanchions 17a—17a. A cylindrical, hollow, metal, engraving roll having the desired embossing pattern engraved on its surface, or produced thereon by other suitable means, is designated generally 19 and is rotatably mounted between the spaced apart trunnion blocks 18-18a. Conduits 20 and 20a are rotatably attached to the ends of embossing roll 19 to permit the circulation of a fluid, for example, chilled water or ethylene glycol, through the roll for controlling the temperature of the roll. Intermediate, spaced apart, vertically extending stanchions 21—21 are mounted between the two sets of spaced apart vertical support stanchions 17—17 and 17a—17a and have a support plate 22 connected between stanchions 21—21 and the inner vertical support stanchions 17a—17a. Attached to these support stanchions are spaced apart brackets 23—23 which pivotally support a pair of spaced apart, L-shaped support arms 24—24. Support arms 24—24 carry a pair of spaced apart trunnion blocks 25—25. Rotatably mounted between these trunnion blocks is a metal, cylindrical, hollow backup roll, designated generally 26, which has its outer surface covered with a resilient material such as rubber. Backup roll 26 is moved into and out of contact with the embossing roll 19 by means of pneumatically or hydraulically actuated cylinder 27 which has piston rod 28 extending from its upper end. The upper end of piston rod 28 is pivotally connected to the lower outer extremity of one support arm 24. The lower end of the hydraulic cylinder 27 is attached to the base plate 16. By varying the air or oil pressure applied to the cylinder 27, the pressure of the backup roll 26 against the face of the embossing roll 19 may be controlled over a wide range to apply the desired force to the thermoplastic film being embossed. Conduits 67 and 67a are rotatably connected to opposite ends of the backup roll to provide a flow of cooling fluid, such as chilled water or ethylene gylcol, to the roll to regulate its temperature.

A cooler roll 68 is mounted between brackets 69 and 69a that are attached to plate 22. Conduits 70 and 70a are rotatably attached to each end of the cooler roll to provide a flow of cooling fluid to the cooler roll. The cooler roll helps remove heat from the surface of the resilient covering on the backup roll. It is not essential that a cooler roll be provided; however, it is preferred to use one since most resilient coverings for the backup roll are relatively poor heat conductors.

Each embossing machine 15 and 15a has a pair of spaced apart, heated air supply assemblies, the outer assembly on each machine being designated generally 29, and the inner assembly on each machine being designated generally 29a. The outer assembly 29 is mounted on a cross member 30 carried on the rear pair of spaced apart vertical stanchions 17—17. The inner heated air supply assembly 29a is supported on a cross member 31 which extends between the forward vertical support stanchions 17a—17a. The outer air assembly is powered by an electric motor 32 and the inner heated air assembly is powered by a similar electric motor 32a.

In the arrangement depicted in FIG. 1, the left-hand embossing apparatus 15 and the right-hand embossing apparatus 15a are connected together by cross members 33—33 (only one of which is shown). In the arrangement shown, the embossing machines 15 and 15a are arranged to emboss simultaneously two separate webs 34 and 34a of elongated, preformed, plastic film. Two separate sheets or lengths of film 34 and 34a are supplied to the dual embossing apparatuses as a contacting pair of separate films over roller 35. The separate, extended lengths of film 34 and 34a are preferably supplied by extruding the thermoplastic material in the form of a thin wall tube by utilizing the blown bubble technique, e.g., by extruding tubular polyethylene, collapsing and slitting the edges of the collapsed double thickness sheet to provide two, separate, contacting, continuous lengths of plastic film 34 and 34a to feed the left-hand and right-hand embossing apparatuses, respectively. However, it is understood that two sheets of film which have been preformed by slot extrusion, or supplied from rolls of preformed film, or by any other means may be fed to the embossing apparatus of the present invention. While two separate embossing apparatuses are illustrated and described, it is understood that only one embossing apparatus may be used, if desired.

The contacting sheets of film 34 and 34a pass from roller 35 to idler roller 36 mounted on the cross members 33—33. The lower sheet 34a is separated from the upper sheet 34 and passes over the second idler roller 37 mounted on the right-hand embossing apparatus 15a. The top sheet 34 continues straight across roller 36 and is next contacted by idler roller 38 which passes the film 34 onto idler roller 37 mounted on the left-hand embosser. The film then passes next to idler roller 39 which is positioned immediately above the opening 40 provided between the two spaced apart, heated air supply assemblies 29 and 29a. The film then passes into the zone 41 beginning at the lower end of the heated air assemblies, where a stream of heated air is directed against each side of the web 34 or 34a, as can be seen more clearly in FIG. 3. After the film is heated above its softening point by the recirculating heated air, it next passes into the nip 42 of the embossing roll 19 and the backup roll 26. The heated film is then pressed against the embossing roll by the resilient roll and is imprinted with the design employed on the embossing roll. The film continues in contact with the embossing roll through approximately 90° of arc and then is passed on to an auxiliary cooling roller 43 which can be cooled by a liquid coolant, if desired. Cooling roller 43 is mounted on trunnion blocks 44—44 attached to stanchions 17a—17a. The film next passes to idler roller 45 and then on to windup roll 46 which is driven by a suitable drive mechanism (not shown) to wind the embossed film into a roll.

The embossing roll 19 and the backup roll 26 are preferably driven by a synchronous drive mechanism (not shown). Additionally, a pair of driven rolls may be used in place of the idler roll 39 to provide additional control, if desired.

Figure 2:
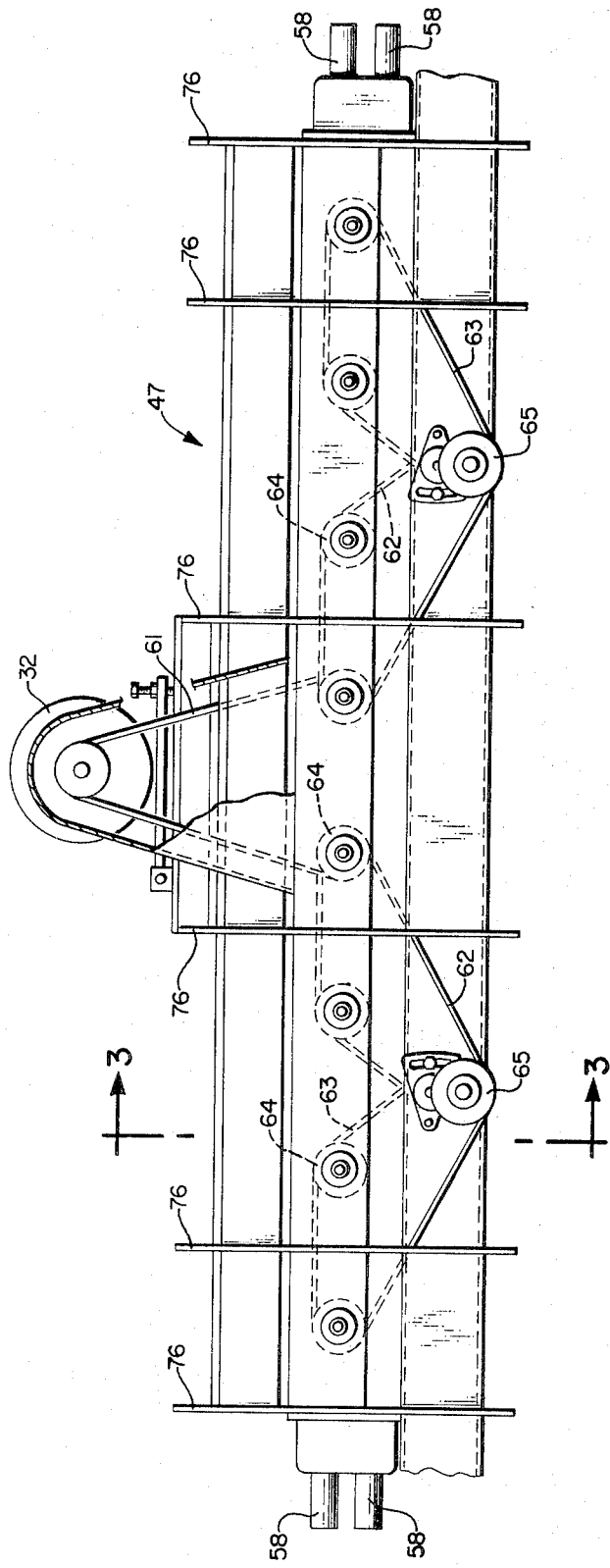
FIG. 2 is a rear, elevational view of the air heater assembly of the apparatus of FIG. 1.
Figure 3:
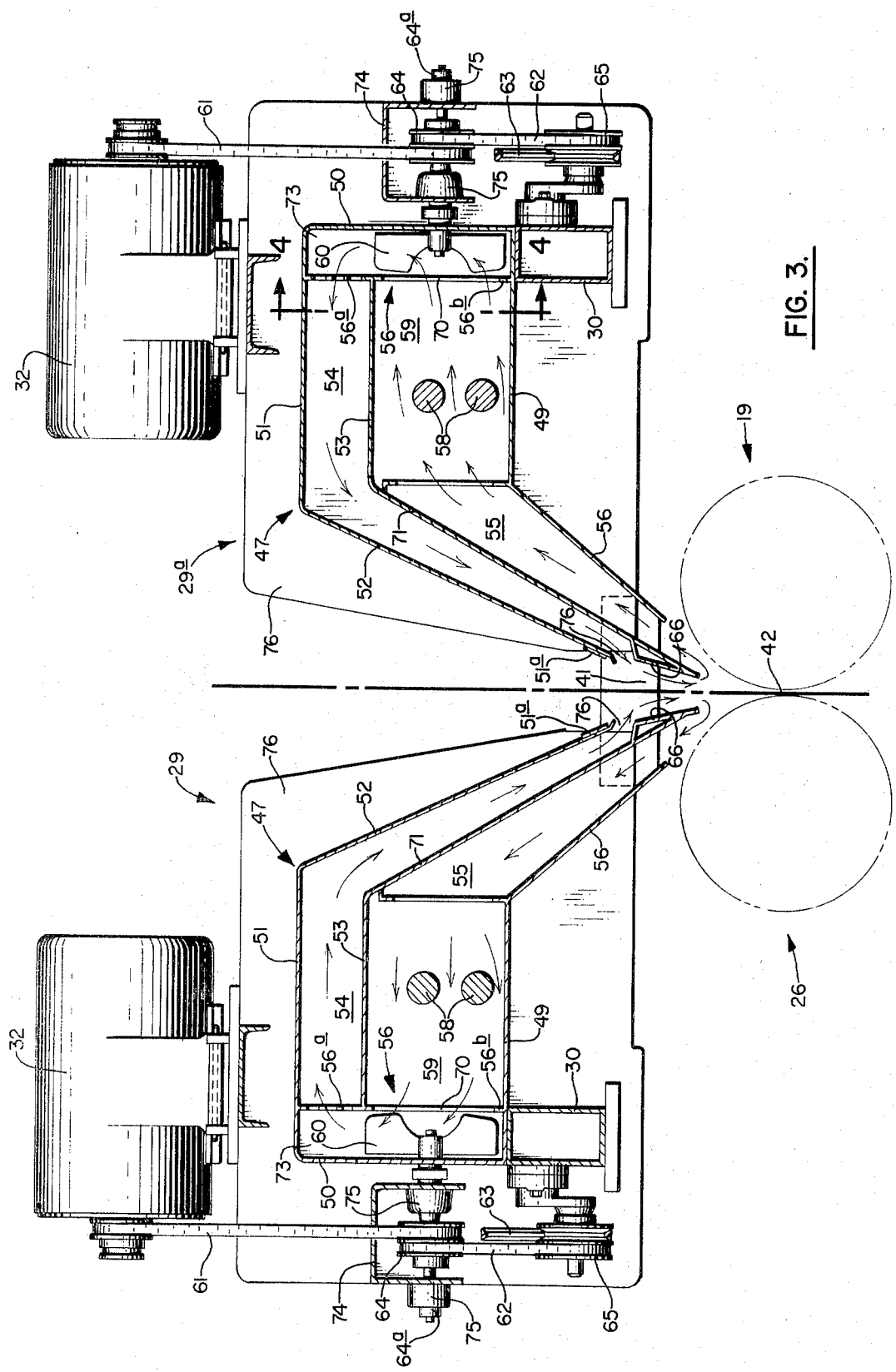
FIG. 3 is a cross-sectional view along line 3—3 of FIG. 2.
Figure 4:
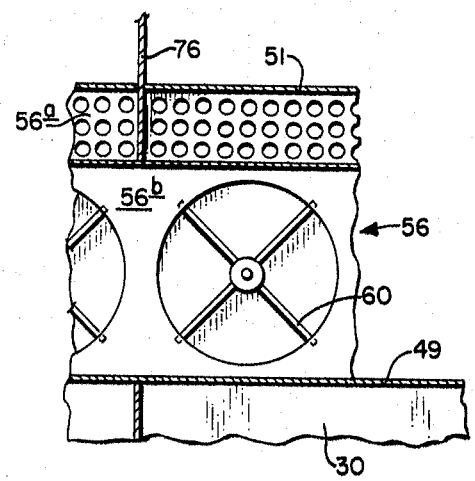
FIG. 4 is a cross-sectional view along line 4—4 of FIG. 3.

Referring now to FIGS. 2, 3 and 4, the construction of the heated air supply assemblies 29 and 29a is depicted. Each assembly includes a generally rectangular housing designated 47. Since the two embossing machines utilize a total of four heated air supply assemblies, the construction of each of which are duplicates of the other, the construction of only one of the heated air supply assemblies will be described in reference to FIGS. 2, 3 and 4, and it will be understood that each opposing heated air supply assembly 29a has corresponding parts designated by the same reference numerals as used in describing the left-hand assembly 29 of FIG. 3.

The housing 47 may be fabricated from sheet metal or other suitable material. It may be covered with heat insulation (not shown), if desired. The housing includes a lower panel 49 attached to the cross member 30, a back panel 50 connected to the lower panel 49 and to an upper panel 51. A diagonal front panel 52 is attached to the end of upper panel 51 and extends downwardly therefrom and has a reinforcing strip 51a attached to its lower end. The housing includes a transverse divider member which has a generally rectangular upper portion 53 and a diagonally, downwardly extending lower portion 71 which divides the housing into an upper heated air supply compartment 54 and a lower heated air return compartment 55. A diagonally extending member 56 is attached to the outer end of lower or bottom panel 49 and forms a part of the heated air return compartment 55. Rear, perforated, vertically extending separator 56 is mounted at the rear of the return and supply compartments and has an upper perforated vertical separator section 56a which extends between panels 51 and 53. The lower portion 56b is provided with circular openings 72, one in front of each fan or blower 60 located in fan compartment 73. Electrical heaters 58, which may be Calrod or open filament type resistance heaters, extend through the heater compartment 59. Electric motor 32 drives a plurality of separate air blowers 60, each mounted on a shaft 64a which extends rearwardly through the back panel 50 of the housing. Motor 32 is connected by first drive belt 61, a pair of second drive belts 62—62, and a pair of third drive belts 63—63, which belts engage drive pulleys 64 attached to fan shafts 64a and idler pulleys 65 affixed to the cross member 30. Inverted U channel 74 has bearing blocks 75 attached thereto which receive the shafts 64a for rotation therein. While the embodiment of the invention shown in FIGS. 2 and 3 utilizes eight air blower fans 60, it is understood that any number of fans may be utilized which will provide proper circulation of the heated air. A plurality of reinforcing bulkheads 76 are provided around the housing at each end thereof to provide rigidity for the housing 47.

As seen in FIG. 3, the fans will substantially recirculate the air contained in the apparatus through the heated air supply compartment 54 out the exit slot 76 between panels 52 and 71 and impress and direct the flow of heated air in the contact zone 41 against one side of the web 34. As seen by the flow arrows, the air passes across the web 34 in the zone 41 and is returned through the return compartment 55 by passing underneath the L-shaped reinforcing extension 66 which is mounted on the lower edge of the divider panel 71. The recycled air is deflected upwardly into return compartment 55 by contact with the resilient backup roll 26 for the left or outer heated air supply and the embossing roll 19 for the right and inner air supply. The recycled air is then picked up in the return compartment 55 and recirculated over the heaters 58—58 in the heater compartment 59 and then is moved to the supply compartment 54 by the fans 60 where it is returned to the zone 41 to heat the plastic film to the desired temperature for embossing.

While it is possible to vary the height of the heating zone 41 over which the heated air impinges against the plastic web 34, it is desirable to maintain this zone as short as possible. The heating zone 41 is considered to extend from the lowest point of the panel 52 in each of the heated air supply assemblies 29 and 29a down to the nip 42 of the embossing and backup rolls. Preferably, this zone has a height of between about 6 inches to about 14 inches. However, if desired, the zone may extend as high as 20 inches. It is desirable to maintain this zone so as to have as short a height as possible in order to minimize sag and fluttering of the plastic web after it is heated.

Additionally, it is important to heat only a short rectangular section of the film immediately before it is gripped by the nip of the embossing and backup rolls. It is preferable to have the electric heaters 58 powered by a variable power source in order to regulate the temperature of the air exiting from the compartment 54. When embossing polyethylene film of thicknesses from about 0.75 mils to about 2.5 mils, the temperature of the air exiting from the heated air compartment may range from about 300°F to about 500°F. Polyethylene films having an unembossed thickness of from about 0.75 mils to 4.0 mils have been successfully embossed using heating air temperatures ranging from 200°F to 800°F.

The pattern on the embossing roll 19 may be any pattern desired to transfer to the embossed film. For best results in producing soft, flexible, embossed film with low gloss and good modulus, it has been found that the pattern on the embossing rolls should be small, have sharp breaks and have a minimum of flat surfaces so as to reduce reflection of incident light (gloss) on the embossed film. While male or female patterns may be used, it has been found that best results are obtained when a male (protruding) pattern is used since this provides easier balanced heat transfer from the two sides fo the film web to the metallic roll and to the resilient (rubber) or other soft material backup roll. The balance of heat transfer reduces the rate of crystal growth, thus minimizing the tendency of the film to curl on the edges. The pattern on the embossing roll may be from about 200 points per inch to about 25 points per inch. One preferred pattern is a male quadrangular pattern of 55 points per inch having a recess depth of about 0.0043 inch. However, other patterns can be used to produce satisfactorily embossed films.

Another important parameter to be controlled in producing embossed film with the apparatus and process of the present invention is the temperature of the embossing roll 19 and the backup roll 26. It has been found that chilled water is satisfactory for removing the heat from these two rolls. While the temperature of the embossing and backup rolls will necessarily be dependent upon the type of plastic film being embossed, e.g., whether it is polyethylene or polyvinyl chloride or other thermoplastic material, and the thickness of the material, it has been found when processing polyethylene film made from polyethylene having a density of from 0.915 to 0.960 that temperatures in the range of from about 10°F to about 150°F are satisfactory.

Another parameter to be controlled to provide satisfactorily embossed thermoplastic film is the speed of the film web as it passes through the nips of the embossing and backup rolls. This parameter will necessarily be influenced by the type of material being embossed, e.g., the softening point of the film and the thickness of the web to be embossed. Film speeds for satisfactorily embossing polyethylene film range from about 30 feet per minute to about 300 feet per minute.

In general, when embossing polyethylene film of medium densities and thicknesses ranging from 0.5 to 5 mils, the apparatus and process of the present invention have produced film having gloss values ranging from 3.8 to 12.5 points as determined by a Gardner Gloss Meter employing a 45° head. The modulus of the film produced has ranged from 6,000 psi to 30,000 psi. Tensile strengths at 25 percent elongation have range from 500 gms/inch to 1,100 gms/inch. The foregoing values are not to be taken to be limited, and it is readily apparent that films having widely ranging physical property values different from those given above can be produced by changing the processing conditions and/or the raw materials.

The apparatus of the present invention described hereinbefore has been used to produce a wide variety of embossed thermoplastic films having desirable properties.

While there has been described preferred embodiments of the present invention, it will be apparent to those skilled in the art that various modifications and changes may be made without departing from the essence of the invention. It is intended to cover herein all such modifications and changes as come within the true scope and spirit of the following claims.

What is claimed is:

1. In an apparatus for supplying and recirculating heated air for embossing thermoplastic film, the combination comprising:
   a. an elongated housing having a narrow, rectangular heated air exit slot and an adjacent, narrow, rectangular return air entry slot extending substantially the full width of said housing;
   b. longitudinal divider means within said housing separating the interior of said housing into a heated air supply compartment and a return air compartment;
   c. heating means in one of said compartments for heating the air moving through said compartment;
   d. means connecting said heated air supply compartment to said return air compartment;
   e. fan means for recirculating air through said heated air supply compartment and said return air compartment; and
   f. power means located outside of said housing connected to said fan means for driving said fan means.

2. In the apparatus of claim 1 wherein said heating means is located in said return air compartment.

3. In the apparatus of claim 1 wherein said heating means is located in said heated air supply compartment.

4. In the apparatus of claim 1 wherein the means of subparagraph d) includes means for diffusing said air.

5. In the apparatus of claim 1 wherein said fan means includes a plurality of fans.

6. In the apparatus of claim 1 wherein said housing is provided with a plurality of spaced apart reinforcing bulkheads.

7. In the apparatus of claim 1 wherein said heating means includes at least one electrical resistance heating element.

8. In the apparatus of claim 5 wherein each of said fans is provided with a shaft that extends rearwardly through said housing, and each of said shafts is provided with a pulley, all of said pulleys being interconnected by drive belts, and all of said drive belts being driven by an electric motor coupled thereto, said motor being located outside of said housing.

9. In an apparatus for embossing thermoplastic film, the combination comprising:
   a. means for guiding a moving, continuous, vertically extending, preformed length of said film into a vertical heating zone;
   b. a pair of side-by-side, spaced apart, opposed, heated air supply ovens defining therebetween said vertical heating zone which has a height substantially less than its width for heating said film to a temperature above its softening point;
   c. a pair of counter-rotating, contacting, embossing rolls positioned adjacent the lower end of said heating zone receiving said heated film for embossing a pattern thereon, said embossing rolls serving as a deflector to return at least a substantial portion of said heated air to said supply ovens after said heated air has contacted said film;

d. recycle means in each of said supply ovens adapted to receive the heated air deflected by said embossing rolls for reheating and reuse; and e. takeup means to move said film through said heating zone and through said pair of embossing rolls.

10. In an apparatus for heating thermoplastic film, the combination comprising:

a. a pair of opposed heated air supply ovens defining therebetween a vertical, narrow, longitudinally extending heating zone adapted to heat said film to its softening point as it passes through said zone, each of said heated air supply ovens including, i. a horizontally extending, elongated, heated air inlet chamber provided with a rear wall having perforations therein, ii. a horizontally extending, elongated, heated air return chamber provided with a rear wall having openings therein mounted below said heated air inlet chamber, iii. a downwardly directed heated air supply duct defined by the space between an upper air deflector structure having its upper end attached to the top of said rear wall of said heated air inlet chamber, and an intermediate air deflector structure having its upper end attached between the lower end of said heated air supply chamber and the upper end of said heated air return chamber, iv. a downwardly directed return air duct defined by the space between a lower air deflector structure having its upper end attached to the lower end of said rear wall on said heated air return chamber and said intermediate air deflector structure;

v. a horizontally extending, elongated, fan chamber having a top wall connected to said rear wall of said air inlet chamber and a bottom wall connected to said rear wall of said return chamber and a rear wall connecting said top and bottom walls, and vi. a plurality of fans in said fan chamber.

11. In the apparatus of claim 10 wherein both said heated air inlet duct and said return air duct terminate in narrow, horizontally extending, rectangular, adjacent slots.

12. In the apparatus of claim 10 wherein said fans are provided with shafts which extend through said rear wall of said fan chamber, said shafts being interconnected by a plurality of drive belts which are coupled to a drive motor located outside of said heated air supply ovens.

13. In the apparatus of claim 10 wherein an L-shaped reinforcing extension is attached to the lower end of said intermediate air deflector structure.

* * * * *

UNITED STATES PATENT OFFICE
CERTIFICATE OF CORRECTION

PATENT NO. : 3,849,050
DATED : November 19, 1974
INVENTOR(S) : James M. Adams, Randall R. Hopper, James K. Rutherfoord, Garland E. Raley.

It is certified that error appears in the above-identified patent and that said Letters Patent are hereby corrected as shown below:

[75]  Inventor Raley's name reads:  Gauland E. Raley
                             should read :  Garland E. Raley Col. 7, Line 19 reads:  fo
              should read :  of

Signed and Sealed this

[SEAL]

ninth Day of September 1975

Attest:

RUTH C. MASON
*Attesting Officer*

C. MARSHALL DANN
*Commissioner of Patents and Trademarks*